United States Patent
Foottit et al.

(10) Patent No.: US 8,494,520 B2
(45) Date of Patent: Jul. 23, 2013

(54) SYSTEMS AND METHODS FOR PROVIDING CENTRALIZED SUBSCRIBER SESSION STATE INFORMATION

(75) Inventors: Tom A. Foottit, Stittsville (CA); Matthew Upton, Orleans (CA)

(73) Assignee: Bridgewater Systems Corp., Ottawa (CA)

( * ) Notice: Subject to any disclaimer, the term of this patent is extended or adjusted under 35 U.S.C. 154(b) by 1144 days.

(21) Appl. No.: 11/878,120

(22) Filed: Jul. 20, 2007

(65) Prior Publication Data
US 2009/0025010 A1    Jan. 22, 2009

(51) Int. Cl.
*H04W 4/00* (2009.01)
(52) U.S. Cl.
USPC ......... 455/435.1; 707/812; 370/236; 719/320
(58) Field of Classification Search
USPC .................. 707/821; 455/435.1; 370/236
See application file for complete search history.

(56) References Cited

U.S. PATENT DOCUMENTS

| | | | | |
|---|---|---|---|---|
| 6,119,000 | A * | 9/2000 | Stephenson et al. | 455/432.1 |
| 6,122,499 | A * | 9/2000 | Magnusson | 455/405 |
| 6,536,037 | B1 | 3/2003 | Guheen et al. | |
| 6,594,483 | B2 | 7/2003 | Nykanen et al. | |
| 6,877,095 | B1 | 4/2005 | Allen | |
| 6,912,388 | B2 | 6/2005 | Yang | |
| 7,054,307 | B2 * | 5/2006 | Papadimitriou et al. | 370/353 |
| 7,224,800 | B1 | 5/2007 | Flykt et al. | |
| 8,015,293 | B2 * | 9/2011 | Schaedler et al. | 709/227 |
| 8,073,444 | B2 * | 12/2011 | Riley | 455/433 |
| 2002/0013827 | A1 | 1/2002 | Edstrom et al. | |
| 2002/0176404 | A1 | 11/2002 | Girard | |
| 2003/0040309 | A1 * | 2/2003 | Hughes et al. | 455/426 |
| 2004/0193943 | A1 | 9/2004 | Angelino et al. | |
| 2004/0199370 | A1 | 10/2004 | Arama et al. | |
| 2004/0203756 | A1 * | 10/2004 | Lin et al. | 455/433 |
| 2004/0248551 | A1 | 12/2004 | Rowitch et al. | |
| 2005/0257267 | A1 | 11/2005 | Williams et al. | |

(Continued)

FOREIGN PATENT DOCUMENTS
WO    WO 2004/107650 A1    12/2004

OTHER PUBLICATIONS

International Search Report with Written Opinion of the International Searching Authority for Int'l Patent Application No. PCT/IB2007/004536 completed on Oct. 19, 2008, and mailed on Oct. 21, 2008, 11 pages.

(Continued)

*Primary Examiner* — Diem Cao
(74) *Attorney, Agent, or Firm* — Zilka-Kotab, PC

(57) ABSTRACT

Systems and methods for providing centralized subscriber session state information are provided. The system includes multiple local session state store servers associated with one or more access control servers and a global location store. When access to a network is attempted, the local session state store server receives an access request message and creates a local session state store record, including a user identifier and information associated with the requested session. The local session state store server also transmits a location message to the global location store. Upon receipt of the location message, the global location store creates a record including the user identifier and a network address for the local session state store server having the session state information for the user. An application requiring user session information can access the global location store and the multiple local session state store servers via a common application programming interface.

19 Claims, 7 Drawing Sheets

U.S. PATENT DOCUMENTS

| | | | |
|---|---|---|---|
| 2005/0266843 A1* | 12/2005 | Shimominami et al. | 455/432.3 |
| 2006/0075080 A1 | 4/2006 | Burr et al. | |
| 2006/0140385 A1* | 6/2006 | Haase et al. | 379/221.09 |
| 2006/0195597 A1 | 8/2006 | Shaked et al. | |
| 2007/0159976 A1* | 7/2007 | Dekeyzer et al. | 370/236 |
| 2007/0287452 A1* | 12/2007 | Pan | 455/435.1 |
| 2008/0013533 A1* | 1/2008 | Bogineni et al. | 370/389 |
| 2009/0138606 A1* | 5/2009 | Moran et al. | 709/227 |
| 2011/0060771 A1* | 3/2011 | Llorente et al. | 707/812 |

OTHER PUBLICATIONS

Lei, Hui, et al. "Dynamic Distributed Trust Model to Control Access to Resources Over the Internet," 2003 IEEE, pp. 988-991.

Zeichner, Marvin L., et al. Abstract for "Distributed Processing Architecture for a Hospital Information System," Institution of Mechanical Engineers, IEEE, New York, NY, 1979, pp. 859-865.

\* cited by examiner

SYSTEMS AND METHODS FOR PROVIDING CENTRALIZED SUBSCRIBER SESSION STATE INFORMATION

FIELD OF THE INVENTION

This application relates generally to data communications and specifically to the provision and use of user session information.

BACKGROUND OF THE INVENTION

When a user access a network (e.g., logs onto an Internet service provider, turns on a wireless data device, etc.), the user is typically authenticated by the network. As part of the authentication process, a decision is made as to whether the user is allowed to access the network. Authentication and access control decisions are typically made by a dynamic host configuration protocol (DHCP) server or an authentication, authorization, and accounting (AAA) server such as a remote access dial in user service (RADIUS) or DIAMETER server (referred to generally herein as "access control servers"). If the user is permitted to access the network, a session is established for the user. The DHCP and AAA servers retain information regarding the user's current session.

Many applications require this session information in order to provide a service to a user. In current environments, the application must query the server which authenticated the user to obtain the needed session information. However, a single service provider, particularly a large geographically diverse service provider, may have numerous access control servers. Additionally, a service provider offering a variety of network types (e.g., wireline and wireless networks) may have multiple types of access control servers. In these complex service provider infrastructures, a user can come onto the network anywhere using any supported technology. An application may then need to query numerous servers using various message formats to find the server storing the session information for a particular user. The task of obtaining user session information is further complicated if the information is located in the network of another service provider. This situation typically occurs when a user roams into the service territory of another service provider. In roaming situations, an application in the user's home network may have no knowledge of a user's present location and therefore has no means to access session state information for that user.

One technique to obtain user session information is to write customized access modules for each type of access control server supported by a service provider. For example, an application may have a module for accessing a DHCP server, a module for accessing a RADIUS server, and a module for accessing a DIAMETER server. However, not all servers provide an interface for accessing session data. Thus, integrating these modules into an application may not be possible.

Another possible technique to obtain session information is to sniff packets from the network in real-time and trigger events based on the captured message. However, real-time sniffing of packets is complex and cannot provide non-message triggered events such as DHCP expiry events or missed RADIUS packets.

Therefore, what is needed is a system and method for providing centralized user session state information.

What is further needed is a common application programming interface (API) that can be used to access state information regardless of where and how a user accessed a network.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
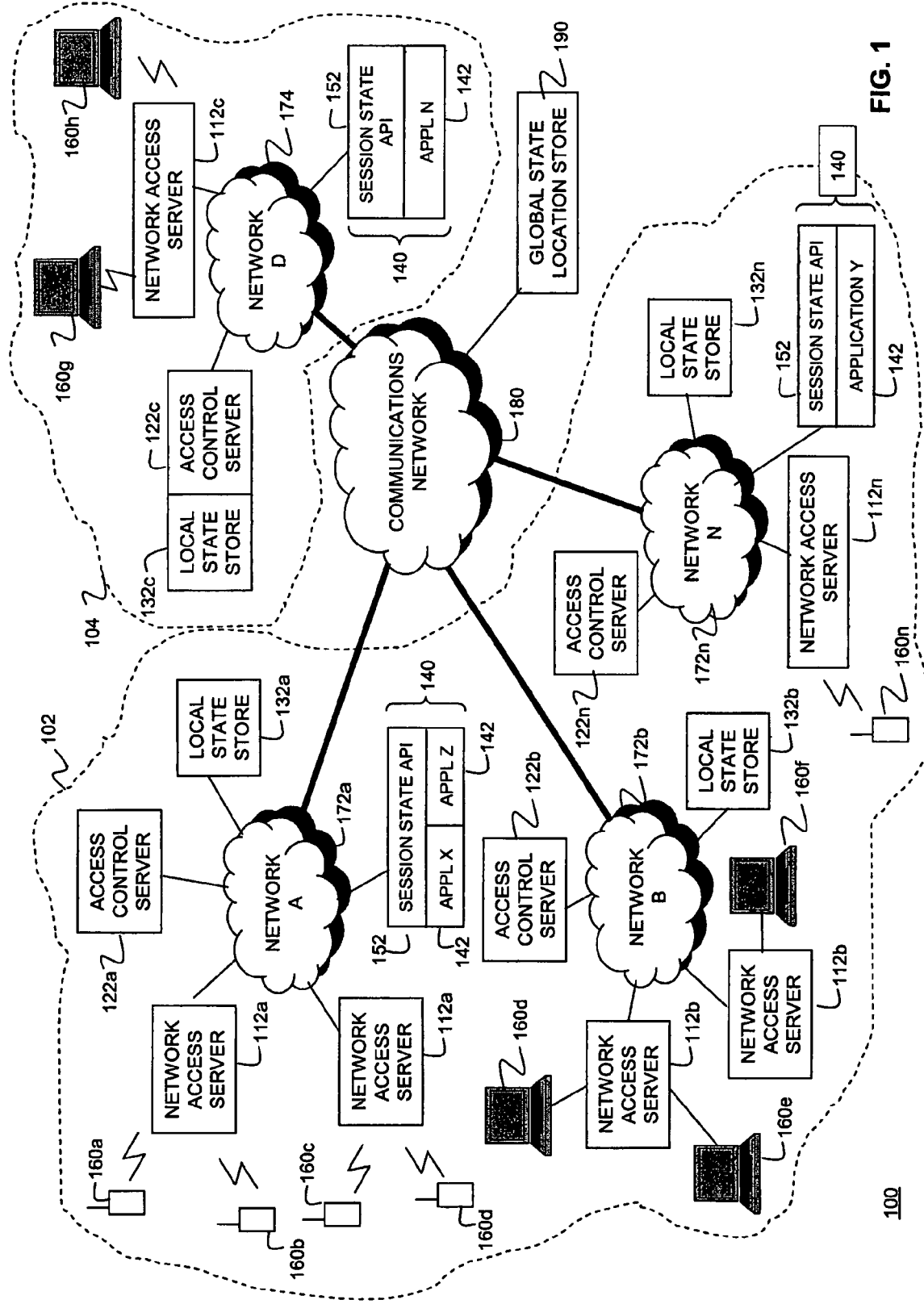
FIG. 1 is a block diagram of an exemplary operating environment for a system for providing centralized subscriber session state information, according to embodiments of the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

1. Structural Embodiments

FIG. 1 is a block diagram of an exemplary operating environment 100 for a system for providing centralized subscriber session state information, according to embodiments of the present invention. Exemplary operating environment 100 includes a first service provider infrastructure 102, a second service provider infrastructure 104, an optional communications network 180, and a global location store 190. Although two service provider infrastructures are depicted, operating environment 100 may include any number of service provider infrastructures.

Exemplary service provider infrastructure 102 includes one or more networks 172*a-n*. Network 172 may be any type of public or private communication network including, but not limited to, a wireline network, a wireless telecommunication and/or data network (e.g., TDMA, CDMA, GSM, Wi-Fi, or WiMax networks). Each network 172 includes one or more network access servers 112*a-n*, one or more access control servers 122*a-n*, one or more local state stores 132*a-n*, and optionally one or more application servers 140. In addition or alternatively, multiple networks may share a network access server 112, an access control server 122, a local state store 132, and/or an application server 140.

Devices 160a-c and device 160n in the first service provider infrastructure 102 access network 172 via a wireless communication protocol. Devices 162d-f in the first service provider infrastructure 102 access network 172 via a wired communication protocol. When a device 160 attempts access to a network, the device 160 is connected to a network access server 112 which facilitates authentication of the user and/or user device. After the device is successfully authenticated, the device 160 may access an application 142 via network 172.

Devices 160a-n may be any type of wired or wireless communication devices including, but not limited to, a wireless phone, a personal digital assistant (PDA), a mobile computer, a laptop, a computer, a wireline telephone, a television, or any similar device with communication capability. Devices 160a-n are configured to access one or more networks 172 in their home service provider infrastructure (e.g., service provider infrastructure). In addition, devices 160a-n may be configured to access one or more networks in a third party service provider infrastructure (commonly referred to as "roaming"). Devices 160a-n may also include software and/or hardware for accessing applications deployed in their home service provider infrastructure and/or a third party service provider infrastructure.

A network access server 112 is configured to receive requests from users for access to a network and to interact with users via user devices to obtain additional information that may be necessary to authenticate the user and/or user device to the network (e.g., password). For example, user devices 160a and 160b request access to network A 172a from network access server 112a. Network access server 112 is further configured to generate an access request message and to transmit the access request message to the access control server 122 supporting the network. The format of the access request message is dependent upon the protocol being used for authentication and authorization of a user. Examples of authentication and authorization protocols include dynamic host configuration protocol (DHCP), remote authentication dial in user service (RADIUS), DIAMETER, and terminal access controller access control system (TACACS). As would be appreciated by persons of skill in the art, any type of authentication and/or authorization protocol or technique could be used with the present invention. For access control and authentication services, network access server 112 acts as a client of access control server 122.

Access control server 122 is configured to receive access request messages from a network access server 112 and to forward the access request messages or copies of the access request messages (referred to herein as "the access request proxy messages") to the appropriate local state store 132. Access control server 122 also includes logic for performing authentication and/or access control processing. Access control server 122 may support any type of user access control and/or authentication. For example, access control server 122 may be a DHCP server or an authentication, authorization, and accounting (AAA) server supporting, for example, RADIUS or DIAMETER. A single access control server 122 may support multiple network access servers 112.

Local state store 132 is configured to store session state information for users and/or user devices accessing a network via one or more associated network access servers 112. Typically, established data sessions are not long in duration. Therefore, data in the local state store 132 changes rapidly. Because large networks may have millions of subscribers and/or users, local state stores 132 are distributed throughout a service provider's infrastructure. For example, local state store 132a stores session state information for users and/or user devices accessing network A 172a via the two illustrated network access servers 112a and local state store 132b stores session state information for user accessing network B 172b.

Local state store 132 is further configured to update a global state location store 190 when new user session information is obtained. In an embodiment, local state store 132 accesses the global state location store 190 via communications network 180. Communications network 180 may be a portion of one or more networks 172a-n or a separate network.

Local state store 132 may also include logic for deleting user session state records. For example, because user sessions are typically short lived, local state store 132 may delete user session records after a predetermined period of time has elapsed since creation of the record. Alternatively, local state store 132 may receive a message indicating that a specific user session has ended A local state store 132 may be provided on a separate state server or may be integrated with a DHCP or AAA server.

Figure 2:
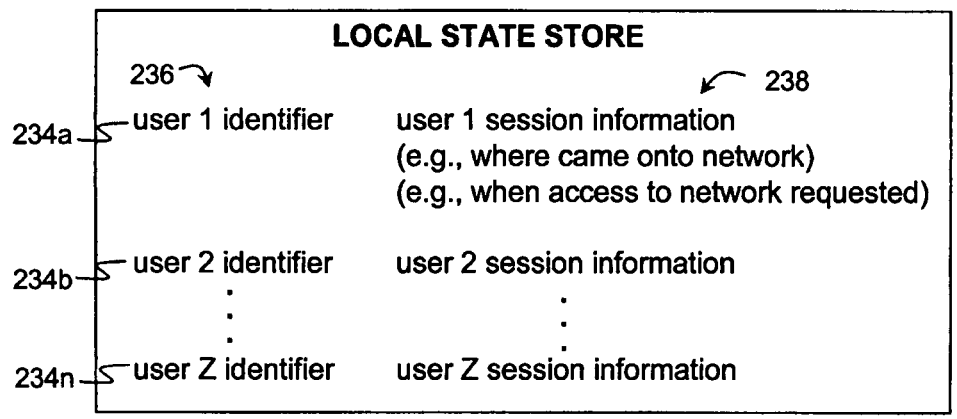
FIG. 2 depicts an example of user session data records stored in a local state store, according to embodiments of the present invention.

FIG. 2 depicts an example of user session data records stored in a local state store 132, according to embodiments of the present invention. As illustrated in FIG. 2, a local state store stores multiple user session state records 234a-n. Each user session state record includes a user identifier 236 and associated user session information 238. A user identifier 236 is any type of identifier which can uniquely identify the user or the user device on the network for a period of time. An example user identifier is the IP address of the user device. Session state information is any information associated with the state of a user's session on the network. Examples of user session state information include data related to where the user came onto the network and data related to when access to the network by the user was requested.

Global state location store 190 is configured to store data related to the location of session state information for users. Global state location store 190 supports multiple local state stores 132. Global state location store 190 may be provided by (and integrated into) a service provider's infrastructure (e.g., service provider 102). Alternatively, global state location store 190 may be provided by a third party. A global state location store 190 may also support multiple service providers, as illustrated in FIG. 1.

Figure 3:
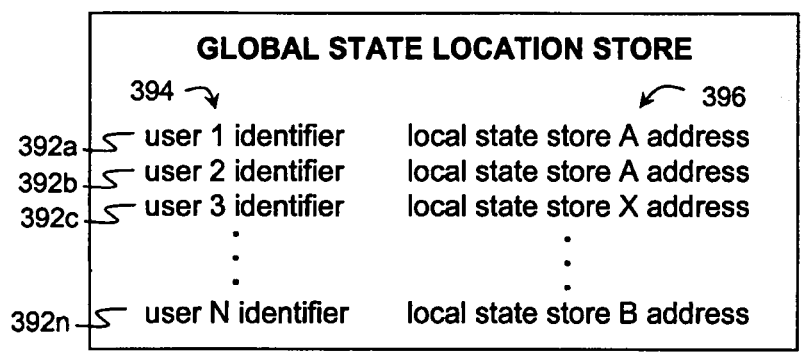
FIG. 3 depicts an example of user global state location records stored in global state location store, according to embodiments of the present invention.

FIG. 3 depicts an example of user global state location records stored in global state location store 190, according to embodiments of the present invention. As illustrated in FIG. 3, the global state location store stores multiple user global state location records 392a-n. Each global state location record 392 includes a user identifier 394 and user session state location information 396. The user identifier 394 may be the same user identifier included in local state store records 234. Alternatively, a different user identifier 394 may be used. User session state location information 396 includes the address of the local state store holding the session state information for the user. In the example depicted in FIG. 3, the session state information for users 1 and 2 is stored in local state store A; the session state information for user 3 is stored in local state store X; and the session state information for user N is stored in local state store B.

Global state location store 190 may also include logic for deleting global state location records. For example, because user sessions are typically short lived, global state location store 190 may delete user session records after a predetermined time period has elapsed since creation of the record. Alternatively, global state location store 190 may receive a message (e.g., from local state store 132) indicating that a specific user session has ended.

Returning to FIG. 1, a network 172 may have one or more application servers 140. An application server 140 includes one or more applications 142 and optionally a session state API 152. A session state API 152 is provided on an application server 140 having an application which requires access to user session information. Session state API 152 provides a common interface for an application to access user session state information regardless of where the user is located or how the user connected to a network. Thus, an application does not require customized modules for accessing the different types of access control servers. Any application requiring access to user session state information can read to the same session state API 152.

Session state API 152 is also configured to generate a query to a global state location store 190 for the location of user session state information. Upon receipt of a response from the global state location store 190, the session state API is configured to generate a query to the identified local state store for the required session state information.

FIG. 1 further illustrates a second service provider infrastructure 104. Service provider infrastructure 104 includes a network 174 having a network access server 112, an access control server 122, a local state store 132, and an application server 140. Service provider infrastructure 104 stores the location of user session state information for sessions established in network 174 in global location state store 190.

A centralized global state location store, updated by multiple service providers, is critical for applications which can be accessed from multiple service providers or networks. A subscriber of service provider 102 may roam into the territory of service provider 104 and attempt access to network 174. Session information for the subscriber is then stored in the location state store 132c of network 174. If the subscriber then accesses an application hosted by his home network 172a, the application via session state API queries the global state location store 190 to determine where the session information for the subscriber is located. The session state API can then query the location state store 132c in service provider infrastructure 104 to obtain the required information.

2. Methods for Providing Centralized Subscriber Session State Information

Figure 4:
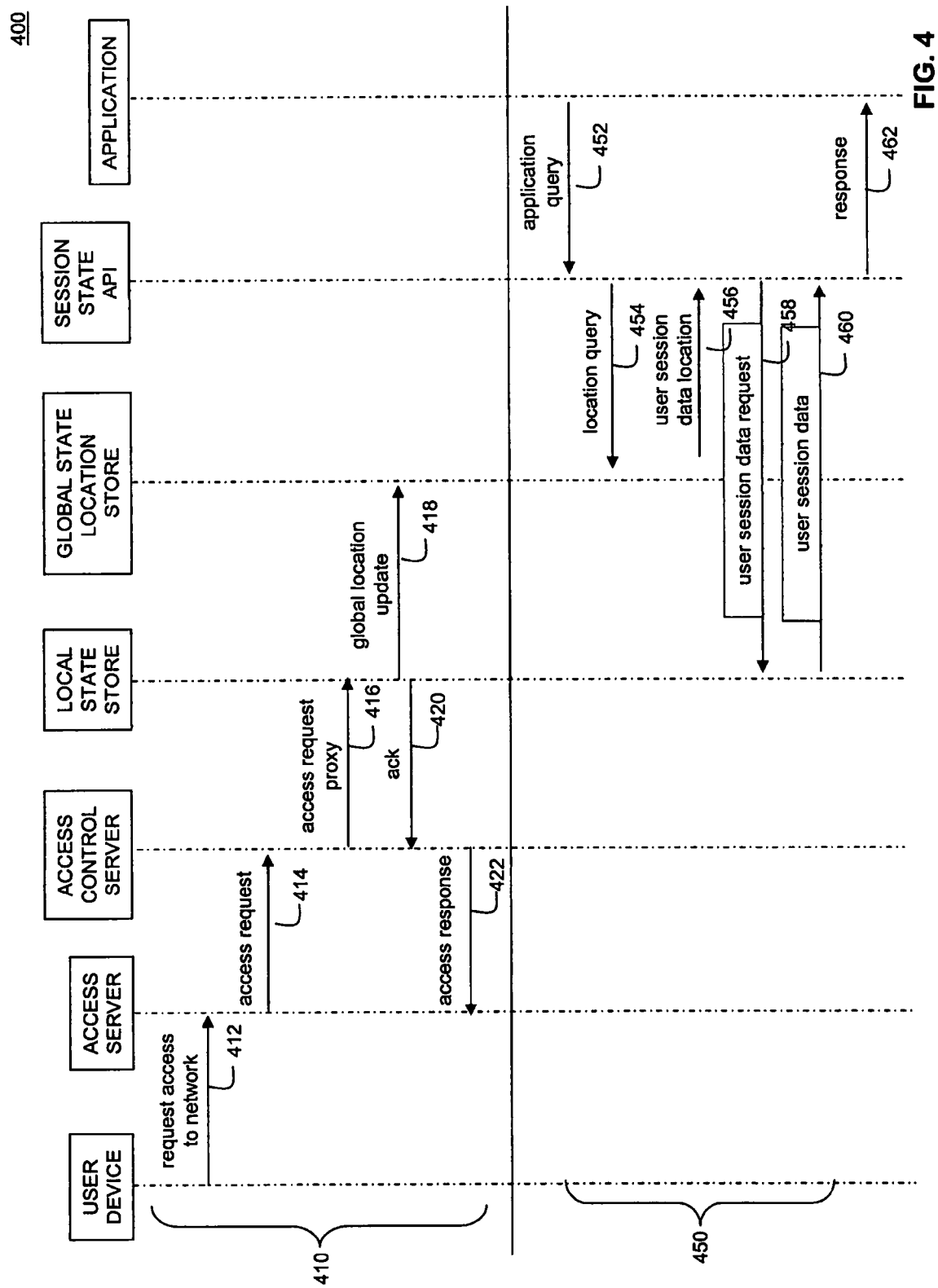
FIG. 4 is a block diagram of a high level call flow for a method for providing centralized subscriber state information, according to embodiments of the present invention.

FIG. 4 is a block diagram of a high level call flow 400 of a method for providing centralized subscriber state information, according to embodiments of the present invention. FIG. 4 is described with continued reference to the embodiment illustrated in FIG. 1. However, FIG. 4 is not limited to that embodiment.

For ease of description call flow 400 is separated into two separate calls flows. The first call flow, call flow 410, is related to a method for updating subscriber session state information in the centralized location. The second call flow, call flow 450, is related to a method for accessing centralized subscriber state information. Call flow 410 includes steps 412 through 422. Call flow 450 includes steps 452 through 462.

Call flow 410 begins at step 412. In step 412, a user device (e.g., user device 160a) requests access to a network (e.g., network A).

In step 414, network access server 112 receives the request from the user device and generates the appropriate access request message or messages required by the authorization and/or authentication protocol supported by the network. The network access server 112 may also interact with the user via the user device to obtain additional information required for authentication of the user. For example, in step 414, network access server 112 may generate a RADIUS access-request message including the user's name and optionally the user's password.

In step 416, access control server 122 forwards the access request message or a copy of the access request message to local state store 132. This forwarded message is referred to herein as an "access request proxy message." Note that access control server 122 performs access control and/or authentication processing upon receipt of the access request message sent in step 414. Thus, one or more of steps 416 through 420 may be performed concurrently with the access control and/or authentication processing occurring at access control server 122.

In an alternative embodiment of steps 414 and 416, local state store 132 receives the access request message from the access server. Local state store 132 then forwards the access request message or a copy of the access request message ("access request proxy message") to the access control server.

Upon receipt of the access request proxy message, local state store 132 creates or updates a session state record for the user. In step 418, local state store 132 transmits a global location update message to global state location store 190. The message includes an identifier for the user or user device and an indication of the location of the user's session state information (e.g., a network address of the local state store). Global location state store 190 may also transmit an acknowledgment message to local state store 132 indicating whether the global location update message was successfully received.

In step 420, local state store 132 transmits an acknowledgment message to access control server 122 indicating whether the session state update was successful. Step 420 is optional.

In step 422, access control server 122 transmits a response to the access request. The response indicates whether access is accepted or rejected. For example, access control server 122 may transmit a RADIUS access-accept message or a RADIUS access-reject message. Note that step 422 is not dependent upon steps 416-420 and therefore may occur prior to any of those steps.

Call flow 450 begins at step 452. Prior to step 452, a user and/or user device initiates an application which requires session state information about the user/user device. In step 452, the application 142 makes a call to the session state API 152.

In step 454, the session state API 152 transmits a location query to the global state location store 190. The query includes one or more identifiers (e.g., IP address of the user device) for the user.

Upon receipt of the location query, global state location store 190 accesses the location record associated with one of the user identifiers included in the location query. In step 456, the global state location store 190 returns the location of the session state information for the user or an indication that the location information could not be found. Note that an individual user may have multiple active sessions on one or more networks at any given time. In this case, the global state location store 190 returns the location for each listed session.

In step 458, session state API 152 transmits a user session data request message to the local state store or stores 132 identified in the response message returned in step 456. The user session data request message includes one or more identifiers for the user. Note that alternatively, the global state location store 190 may forward the location query (step 454) directly to the identified location state store or stores 132. In this embodiment, steps 456 and 458 are not performed.

Upon receipt of a user session data request message, the local state store 132 accesses a record associated with one of the user identifiers included in the message. In step 460, each local state store 132 returns the requested user session state information to the session state API 152 or returns an indication that the requested session state information could not be found.

In step 462, session state API 152 returns a response to the requesting application.

3. Alternate Embodiments

Figure 5:
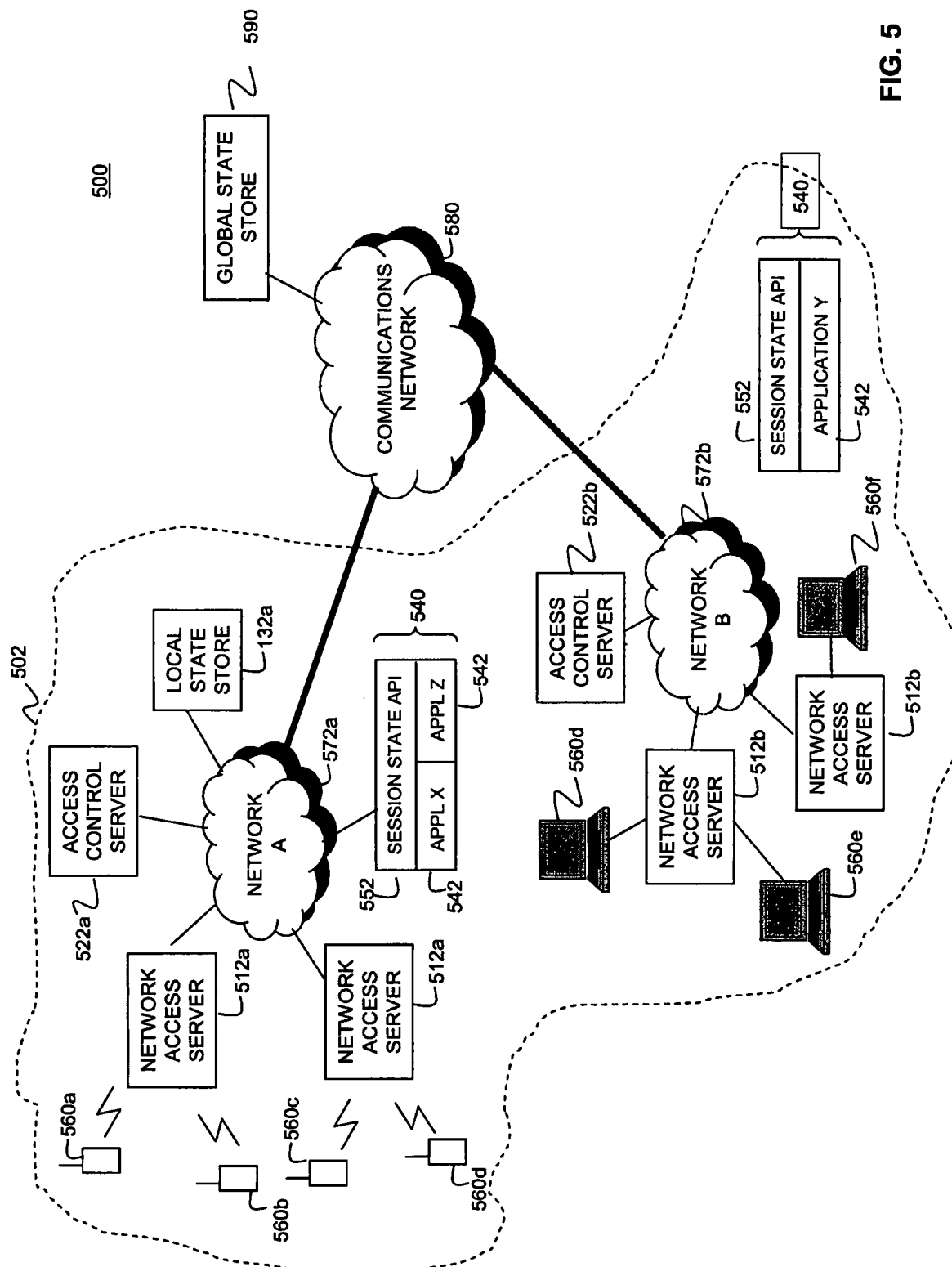
FIG. 5 is a block diagram of an exemplary operating environment for a system for providing centralized subscriber session state information, according to embodiments of the present invention.

FIG. 5 is a block diagram of an exemplary operating environment 500 for a system for providing centralized subscriber session state information, according to embodiments of the present invention. Exemplary operating environment 500 includes a service provider infrastructure 502, an optional communications network 580, and a global state store 590. Although only one service provider infrastructure is depicted, operating environment 500 may include any number of service provider infrastructures.

Exemplary service provider infrastructure 502 includes one or more networks 572a-b. Each network 572 includes one or more network access servers 512a-n, one or more access control servers 522a-n, and optionally one or more application servers 540. Unlike the embodiment depicted in FIG. 1, networks 572 in operating environment 500 do not include a local state store. In addition or alternatively, multiple networks 572 may share a network access server 512, an access control server 522, and/or an application server 540.

Access control servers 522 are configured to receive access request messages from a network access server 512a-n and to forward the access request messages or copies of the access request messages (referred to herein as "the access request proxy messages") to the global state store 590. Access control server 522 also includes logic for performing authentication and/or access control processing. Access control server 522 may support any type of user access control and/or authentication. A single access control server 522 may support multiple network access servers 512. In an embodiment, access control server 522 accesses the global state store 590 via communications network 580. Communications network 580 may be a portion of one or more networks 572a,b or a separate network.

Global state store 590 is configured to store session state information for users and/or user devices accessing a network via one or more associated network access servers 512a-n. For example, global state store 590 stores session state information for users and/or user devices accessing network A 572a via the two illustrated network access servers 512a. Global state store 590 may also include logic for deleting user session state records. For example, because user sessions typically last only a finite period of time, global state store 590 may delete user session records after a predetermined time period has elapsed since creation of the record. Alternatively, global state store 590 may receive a message (e.g., from access control server 122) indicating that a specific user session has ended.

Figure 6:
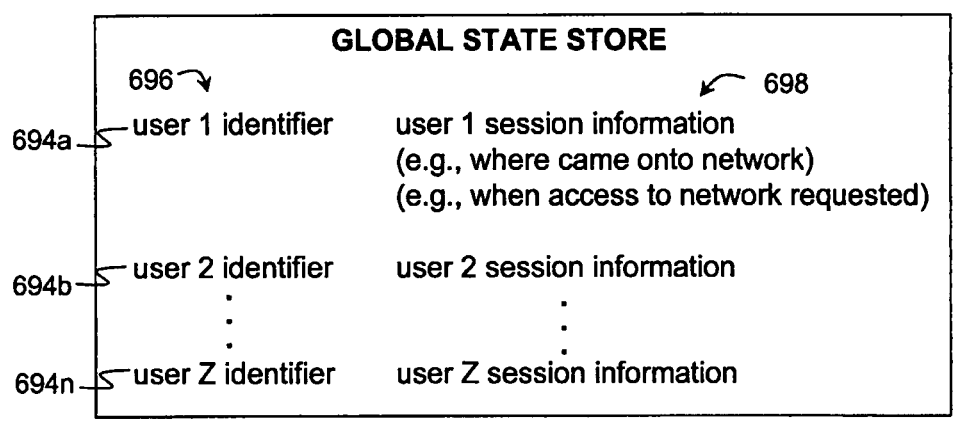
FIG. 6 depicts an example of user session data records stored in a global state store, according to embodiments of the present invention.

FIG. 6 depicts an example of user session data records stored in a global state store 590, according to embodiments of the present invention. As illustrated in FIG. 6, global state store 590 stores multiple user session state records 694a-n. Each user session state record includes a user identifier 696 and associated user session information 698. A user identifier 696 is any type of identifier which can uniquely identify the user or the user device on the network for a period of time. An example user identifier is the IP address of the user device. Session state information is any information associated with the state of a user's session on the network. Examples of user session state information include data related to where the user came onto the network and data related to when access to the network by the user was requested.

Application server 540 includes one or more applications 542 and a session state API 552. A session state API 552 is provided on an application server 540 having an application which requires access to user session information. Session state API 552 is also configured to generate a query to a global state store 590 for the required session state information.

Figure 7:
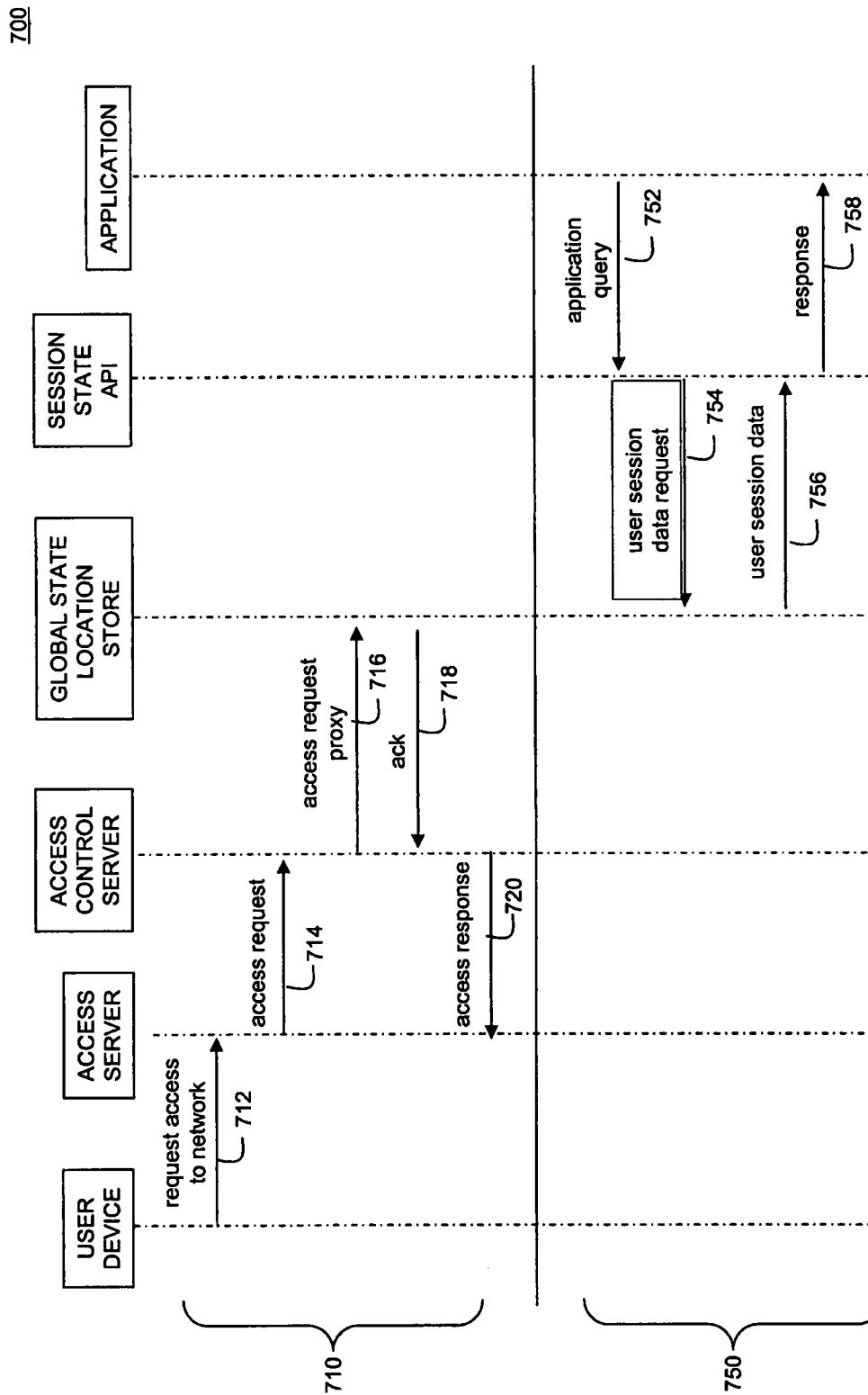
FIG. 7 is a block diagram of a high level call flow for a method for providing centralized subscriber state information, according to embodiments of the present invention.

FIG. 7 is a block diagram of a high level call flow 700 for a method for providing centralized subscriber state information, according to embodiments of the present invention. FIG. 7 is described with continued reference to the embodiment illustrated in FIG. 5. However, FIG. 7 is not limited to that embodiment.

For ease of description call flow 700 is separated into two separate calls flows. The first call flow, call flow 710, is related to a method for updating subscriber session state information in the centralized location. The second call flow, call flow 750, is related to a method for accessing centralized subscriber state information. Call flow 710 includes steps 712 through 720. Call flow 750 includes steps 752 through 758.

Call flow 710 begins at step 712. In step 712, a user device (e.g., user device 560a) requests access to a network (e.g., network A).

In step 714, network access server 512 receives the request from the user device and generates the appropriate access request message or messages required by the authorization and/or authentication protocol supported by the network. The network access server 512 may also interact with the user via the user device to obtain additional information required for authentication of the user. For example, network access server 512 may generate a RADIUS access-request message including the user's name and optionally the user's password.

In step 716, access control server 522 forwards the access request message or a copy of the access request message to global state store 590. This forwarded message is referred to herein as an "access request proxy message." Note that access control server 522 performs access control and/or authentication processing upon receipt of the access request message sent in step 714. Thus, one or more of steps 716 and 718 may be performed concurrently with the access control and/or authentication processing occurring at access control server 522.

In an alternative embodiment of steps 714 and 716, global state store 590 receives the access request message from the access server. Global state store 590 then forwards the access request message ("access request proxy message") to the access control server.

Upon receipt of the access request proxy message, global state store 590 creates or updates an existing session state record for the user. In step 718, global state store 590 transmits an acknowledgment message to access control server 522 indicating whether the session state update was successful. Step 718 is optional.

In step 720, access control server 522 transmits a response to the access request. The response indicates whether access is accepted or rejected. For example, access control server 522 may transmit a RADIUS access-accept message or a RADIUS access-reject message. Note that step 720 is not dependent upon steps 716 and 718 and therefore may occur prior to any of those steps.

Call flow 750 begins at step 752. Prior to step 752, a user and/or user device initiates an application which requires session state information about the user/user device. In step 752, the application (e.g., application N 744) makes a call to the session state API (e.g., session state API 754).

In step 754, the session state API transmits a user session data request message to the global state store 590. The user session data request message includes one or more identifiers for the user.

Upon receipt of a user session data request message, the global state store 590 accesses a record associated with one of the user identifiers included in the message. In step 756, the global state store 590 returns the requested user session state information to the session state API or returns an indication that the requested session state information could not be found. Note that an individual user may have multiple active sessions on one or more networks at any given time. In this case, the global state store 590 returns the session information for the active sessions.

In step 758, session state API returns a response to the requesting application.

4. Computer System Implementation

Figure 8:
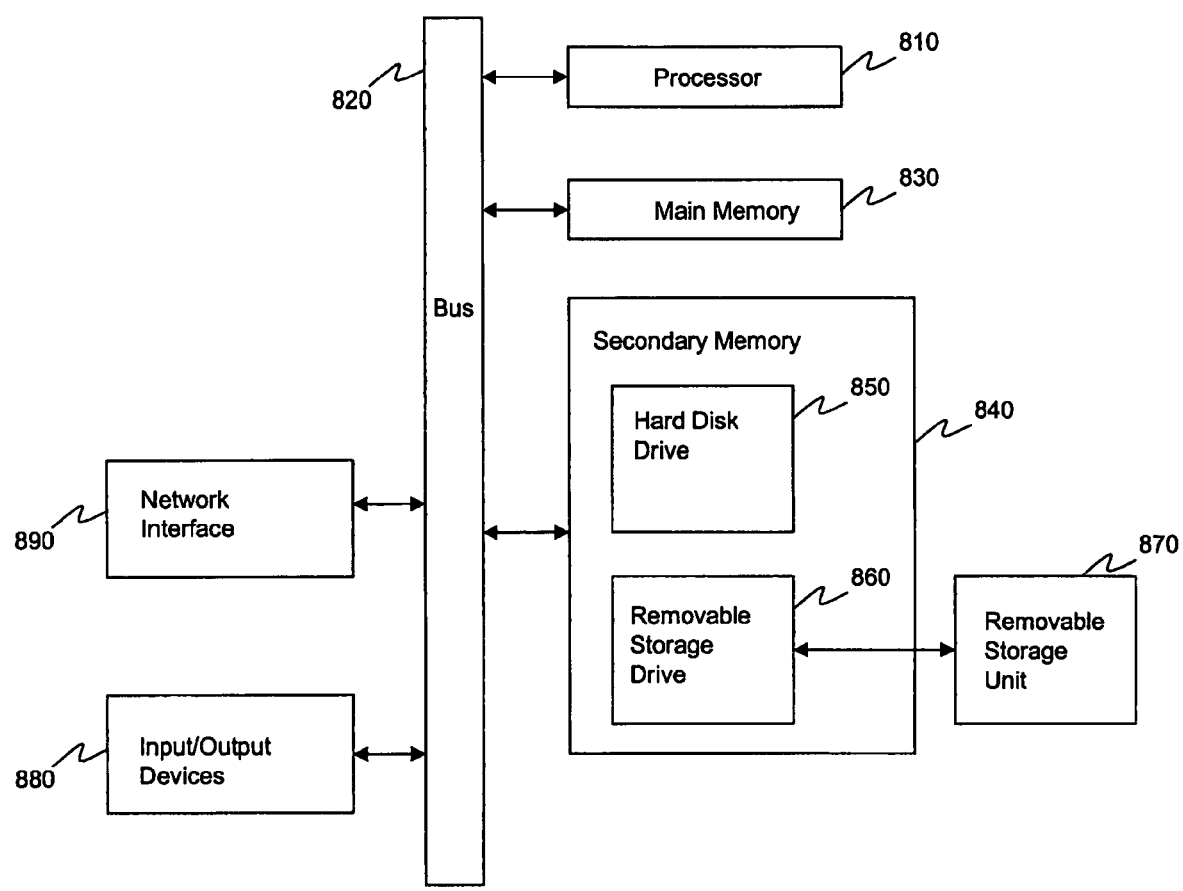
FIG. 8 is a diagram of a computer system on which the methods and systems herein described can be implemented, according to an embodiment of the invention.

In an embodiment of the present invention, the methods and systems of the present invention described herein are implemented using well known computers, such as a computer 800 shown in FIG. 8. The computer 800 can be any commercially available and well known computer or server capable of performing the functions described herein, such as computers available from Gateway, Apple, Sun, HP, Dell, Cray, etc.

Computer 800 includes one or more processors (also called central processing units, or CPUs), such as processor 810. Processor 800 is connected to communication bus 820. Computer 800 also includes a main or primary memory 830, preferably random access memory (RAM). Primary memory 830 has stored therein control logic (computer software), and data.

Computer 800 may also include one or more secondary storage devices 840. Secondary storage devices 840 include, for example, hard disk drive 850 and/or removable storage device or drive 860. Removable storage drive 860 represents a floppy disk drive, a magnetic tape drive, a compact disk drive, an optical storage device, tape backup, etc.

Removable storage drive 860 interacts with removable storage unit 870. As will be appreciated, removable storage unit 860 includes a computer usable or readable storage medium having stored therein computer software (control logic) and/or data. Removable storage drive 860 reads from and/or writes to the removable storage unit 870 in a well known manner.

Removable storage unit 870, also called a program storage device or a computer program product, represents a floppy disk, magnetic tape, compact disk, optical storage disk, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 800, or multiple computer 800s to perform any combination of the functions described herein Computer programs (also called computer control logic) are stored in main memory 830 and/or the secondary storage devices 840. Such computer programs, when executed, direct computer 800 to perform the functions of the present invention as discussed herein. In particular, the computer programs, when executed, enable processor 810 to perform the functions of the present invention. Accordingly, such computer programs represent controllers of the computer 800.

Computer 800 also includes input/output/display devices 880, such as monitors, keyboards, pointing devices, etc.

Computer 800 further includes a communication or network interface 890. Network interface 890 enables computer 800 to communicate with remote devices. For example, network interface 890 allows computer 800 to communicate over communication networks, such as LANs, WANs, the Internet, etc. Network interface 890 may interface with remote sites or networks via wired or wireless connections. Computer 800 receives data and/or computer programs via network interface 890. The electrical/magnetic signals having contained therein data and/or computer programs received or transmitted by the computer 800 via interface 890 also represent computer program product(s).

The invention can work with software, hardware, and operating system implementations other than those described herein. Any software, hardware, and operating system implementations suitable for performing the functions described herein can be used.

5. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for providing centralized subscriber session information, comprising:

receiving, at a global state store server, a plurality of global state location messages, each global state location message including a session user identifier and a location of session information for a user session including an address of a local state store server storing session information describing a state of the user session, wherein at least two of the plurality of global state location messages are from different originators;

for each of the plurality of global state location messages, creating a global state location record in the global state store server including the received session user identifier and the location of session information for the user session including the address of the local state store server storing the session information describing the state of the user session, the session information including data related to where a user associated with the user session came onto a network and further including data relating to when access to the network was requested by the user;

receiving, at the global state store server, a message requesting a location of session information for an application user identifier, where the message is received in response to a user device of the user initiating an application which requires the state of the user session, and where the application sends the message requesting the location of the session information utilizing a session state application programming interface (API);

identifying a plurality of global state location records having a session user identifier matching the received application user identifier;

transmitting, for each of the identified global state location records, the location of session information for the user session, including the address of the local state store server storing the session information describing the state of the user session, included in the identified global state location records, where the location of session information for each of the identified global state location records is transmitted to the session state application programming interface (API) that generates a query to the local state store server associated with the identified global state location records to obtain the session information for each user session; and deleting a global state location record from the global state store server when a predetermined period of time has elapsed since creation of the global state location record.

2. The method of claim 1, wherein receiving the plurality of global state location messages further comprises:
receiving a first global state location message from a first local state store server, wherein the first local state store server transmits the first global state location message upon receipt of an access request proxy message from an access control server.

3. The method of claim 1, wherein receiving the plurality of global state location messages further comprises:
receiving a first global state location message from a first local state store server, wherein the first local state store server transmits the first global state location message upon receipt of an access request message from a network access server.

4. The method of claim 2, wherein the access request proxy message is a dynamic host configuration protocol (DHCP) message.

5. The method of claim 2, wherein the access request proxy message is a remote authentication dial in user service (RADIUS) message.

6. The method of claim 2, wherein the access request proxy message is a DIAMETER message.

7. The method of claim 1, wherein the location of session state information for the user session is a network address of a local state store server.

8. The method of claim 1, wherein receiving the plurality of global state location messages further comprises:
receiving a plurality of global state location messages from a plurality of local state store servers, wherein at least two of the plurality of local state store servers are in different networks.

9. The method of claim 1, wherein receiving the message requesting the location of session information for the application user identifier comprises:
receiving a message requesting the location of session information for an application user identifier from the session state application programming interface (API), wherein the session state application programming interface (API) is configured to access session information generated by a plurality of different access request protocols.

10. The method of claim 1, wherein each session user identifier uniquely identifies at least one of a user and a device, for a period of time.

11. The method of claim 1, wherein the global state store server stores data related to the location of session information from the plurality of global state location messages associated with a plurality of users and further supports a plurality of local state stores.

12. The method of claim 1, wherein each of the session user identifiers included in the global state location messages are the same as a corresponding user identifier included in the local state store server storing session information describing the state of the user session.

13. The method of claim 1, wherein each of the session user identifiers included in the global state location messages are different than a corresponding user identifier included in the local state store server storing session information describing the state of the user session.

14. A method for providing centralized subscriber session information in a local state store server, comprising:
receiving a plurality of access request proxy messages at a local state store server, each access request proxy message including a session user identifier;
for each of the plurality of access request proxy messages, creating a local session state record in the local state store server including the received session user identifier and session information describing a state of an associated session, the session information including data related to where a user of the associated session came onto a network and further including data relating to when access to the network was requested by the user;
for each of the plurality of access request proxy messages, and in response to the creation of the local session state records, transmitting a global location update message to a global state store server, wherein the global location update message includes the session user identifier and a network address for the local state store server storing the local session state record including the received session user identifier and the session information describing the state of the associated session;
receiving, at the local state store server, a message requesting session state information for an application user identifier, wherein the message is directed to the local state store server based upon a determination from the global state store server, using the application user identifier, of the network address for the local state store server storing the local session state record including the received session user identifier and the session information describing the state of the associated session, wherein the message is forwarded from the global state store server to the local state store server, and wherein the message is generated in response to a user device of the user initiating an application which requires the state of the associated session;
identifying a local session state record having a session user identifier matching the received application user identifier;
transmitting the requested session state information included in the identified local session state record; and
deleting a local session state record when a predetermined period of time has elapsed since creation of the local session state record;
wherein the message requesting session state information includes a query sent to the local state store server by a session state application programming interface (API) that is provided the network address for the local state store server;
wherein the network address for the local state store server is determined by the global state store server in response to a message requesting the network address received from the application utilizing the session state application programming interface (API).

15. The method of claim 14, wherein receiving a plurality of access request proxy messages further comprises:
receiving a first dynamic host configuration protocol (DHCP) access request proxy message.

16. The method of claim 14, wherein receiving a plurality of access request proxy messages further comprises:
receiving a first remote authentication dial in user service (RADIUS) message.

17. The method of claim 14, wherein receiving a plurality of access request proxy messages further comprises:
   receiving a first DIAMETER message.

18. The method of claim 14, further comprising:
   deleting a local session state record upon receipt of an indication that the associated user session has ended.

19. The method of claim 14, wherein receiving a message requesting session state information for an application user identifier comprises: receiving a message requesting session state information for an application user identifier from the session state application programming interface (API), wherein the session state application programming interface (API) is configured to access session information generated by a plurality of different access request protocols.

* * * * *